US011934556B2

(12) United States Patent
Krishnan (10) Patent No.: US 11,934,556 B2
(45) Date of Patent: Mar. 19, 2024

(54) IDENTIFYING SENSITIVE CONTENT IN ELECTRONIC FILES

(71) Applicant: PayPal, Inc., San Jose, CA (US)

(72) Inventor: Sekar Krishnan, Chennai (IN)

(73) Assignee: PAYPAL, INC., San Jose, CA (US)

( * ) Notice: Subject to any disclaimer, the term of this patent is extended or adjusted under 35 U.S.C. 154(b) by 349 days.

(21) Appl. No.: 17/489,017

(22) Filed: Sep. 29, 2021

(65) Prior Publication Data

US 2023/0096474 A1   Mar. 30, 2023

(51) Int. Cl.
| | | |
|---|---|---|
| *G06F 21/00* | (2013.01) | |
| *G06F 16/11* | (2019.01) | |
| *G06F 16/16* | (2019.01) | |
| *G06F 21/62* | (2013.01) | |

(52) U.S. Cl.
CPC ........ *G06F 21/6245* (2013.01); *G06F 16/116* (2019.01); *G06F 16/16* (2019.01)

(58) Field of Classification Search
None
See application file for complete search history.

(56) References Cited

U.S. PATENT DOCUMENTS

| | | | | |
|---|---|---|---|---|
| 10,705,796 | B1 * | 7/2020 | Doyle | G06F 16/282 |
| 10,825,449 | B1 * | 11/2020 | Chinnalagu | G10L 15/1815 |
| 11,080,709 | B2 * | 8/2021 | Adjaoute | G06N 5/01 |
| 2018/0351786 | A1 * | 12/2018 | Pope | H04L 41/0654 |
| 2019/0260764 | A1 * | 8/2019 | Humphrey | G06F 18/232 |
| 2019/0286973 | A1 * | 9/2019 | Kovvuri | G06N 3/04 |
| 2021/0026982 | A1 * | 1/2021 | Amarendran | G06F 21/6254 |
| 2021/0064361 | A1 * | 3/2021 | Jayaraman | G06N 20/10 |
| 2021/0182660 | A1 * | 6/2021 | Amirguliyev | G06N 3/084 |
| 2021/0216308 | A1 * | 7/2021 | Vyas | G06N 20/00 |
| 2021/0224258 | A1 * | 7/2021 | Faruquie | G06F 16/244 |
| 2021/0248268 | A1 * | 8/2021 | Ardhanari | G16H 70/60 |
| 2021/0264520 | A1 * | 8/2021 | Cummings | G06Q 40/12 |
| 2021/0279401 | A1 * | 9/2021 | Kramer | G06F 16/254 |

(Continued)

OTHER PUBLICATIONS

Schimmelpfennig, Frederic et al. Streamlining distributed Deep Learning I/O with ad hoc file systems. 2021 IEEE International Conference on Cluster Computing (CLUSTER). https://ieeexplore.ieee.org/stamp/stamp.jsp?tp=&arnumber=9556043 (Year: 2021).*

(Continued)

*Primary Examiner* — Jeremiah L Avery
(74) *Attorney, Agent, or Firm* — Haynes and Boone, LLP (57) ABSTRACT

Systems and methods for identifying sensitive content in electronic files are disclosed. In an embodiment, a request is received to determine whether an electronic file contains sensitive content. The electronic file is preprocessed based on a file type of the electronic file, resulting in a first input file and a second input file. The first input file is inputted to a first machine learning engine, which classifies the first input file for numerical items in the sensitive content. The second input file is inputted to a second machine learning engine, which classifies the second input file for textual items the sensitive content. A report is generated based on a combination of a first output from the first machine learning engine and a second output from the second machine learning engine, where the report indicates items of the sensitive content that are contained in the electronic file.

20 Claims, 5 Drawing Sheets

(56) References Cited

U.S. PATENT DOCUMENTS

| | | | |
|---|---|---|---|
| 2021/0311952 A1* | 10/2021 | Jain | G06N 20/00 |
| 2021/0342430 A1* | 11/2021 | Benkreira | H04L 63/0861 |
| 2021/0374021 A1* | 12/2021 | Santhakumar | G06F 3/0659 |
| 2022/0108167 A1* | 4/2022 | Upadhyay | G06F 3/061 |
| 2022/0114488 A1* | 4/2022 | Gottula | G06N 3/08 |
| 2022/0358357 A1* | 11/2022 | Mathon | G06F 3/015 |
| 2023/0342534 A1* | 10/2023 | Khattel | G06F 30/392 |

OTHER PUBLICATIONS

Chen, X. et al. CUED-RNNLM—An open-source toolkit for efficient training and evaluation of recurrent neural network language models. 16 IEEE International Conference on Acoustics, Speech and Signal Processing (ICASSP). https://ieeexplore.ieee.org/stamp/stamp.jsp?tp=&arnumber=7472829 (Year: 2016).*

Azimi-Sadjadi, M.R et al. An Adaptable Connectionist Text-Retrieval System With Relevance Feedback. IEEE Transactions on Neural Networks, vol. 18, Issue: 6. https://ieeexplore.ieee.org/stamp/stamp.jsp?tp=&arnumber=4359173 (Year: 2007).*

Madhyastha, T.M.; Reed, D.A. Learning to classify parallel input/output access patterns. IEEE Transactions on Parallel and Distributed Systems, vol. 13, Issue: 8. https://ieeexplore.ieee.org/stamp/stamp.jsp?tp=&arnumber=1028437 (Year: 2002).*

* cited by examiner

IDENTIFYING SENSITIVE CONTENT IN ELECTRONIC FILES

TECHNICAL FIELD

The present disclosure generally relates to data privacy and computer security and more particularly to identifying sensitive content present in electronic files according to various embodiments.

BACKGROUND

Organizations oftentimes need to collect and store a large volume of data for its customers. The data collected sometimes is in the form of unstructured data which does not allow for simple rules to be implemented to align with data privacy and computer security policies. For example, unstructured data in the form of conversations (text conversations, voice conversations, etc.) with customers may contain sensitive content that is not easily recognizable by computers. Analyzing the collected data and taking steps to align with data privacy and computer security policies are tasks that have grown to be overly laborious using traditional methods due to the large volumes of data that must be analyzed. Therefore, there exists a need in the art for improved techniques to analyze and detect sensitive content from collected unstructured data.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

Securing sensitive customer information is critical in ensuring compliance and protecting against data breaches. Personally identifiable information (PII) and payment card industry (PCI) data are particular types of sensitive data that are the focus of most organizations' security efforts. Protecting sensitive information such as social security numbers and payment card accounts is especially important for organizations that are responsible for clients' data, such as large retail, banking, healthcare, and software-as-a-service (SaaS) companies. Generally, sensitive content may include types of information such as bank account number, personal identification number (PIN), security code for bank cards (e.g., CCV), international bank account number (IBAN), credit card number, debit card number, biometric information such as weight and height, residential address (e.g., city, country, postal code, street, state, zip code), criminal status, date of birth, account numbers, device identifiers, education information, email address, gender identity, gender, geolocation, income, IP address, internet service provider, MAC address, marital status, military status (e.g., veteran), employer, name (e.g., family, full, given), national origin, phone number, political affiliation, race, ethnicity, religion, health, social media account handles, sexual orientation, social security number, etc.

Oftentimes, organizations may need to collect and store a large volume of data where the data is in an unstructured data format. For example, when customers or clients use communication channels to communicate with the organization, such as through email, online chat, conversational logs, mobile applications, contact centers, social media, and so forth, the customer or client may provide personal and sensitive data (e.g., sensitive content). With such large volumes of data, it is increasingly difficult to analyze the received data and take actions to align with data privacy and computer security policies, especially when the data is in an unstructured data format. The present disclosure describes systems and methods for automatically identifying sensitive content present in electronic files using machine learning, such as for data privacy and computer security purposes.

In one example embodiment, a system may receive a request to determine whether an electronic file (or a plurality of electronic files from a database, e.g., a directory) contains sensitive content. The system may preprocess the electronic file based on a type (e.g., category) of the electronic file. For example, in one preprocessing step, where the electronic file is a PDF file, the PDF file may be converted to a text file (e.g., text from the PDF file may be extracted to generate a text file). In another preprocessing step, the text file may be cleaned to remove noise (e.g., unwanted information) such as certain punctuation marks, stop words, contractions, special characters, accented words, etc. In another preprocessing step, the system may extract text features and/or patterns from the text file. For example, the system may vectorize the text file using word/sentence embedding algorithms to extract context features of the text file or identify patterns in the text file corresponding to sensitive content (patterns for social security numbers, telephone numbers, bank account numbers, bank card numbers, etc.). The extracted features and/or patterns may be inputted to a machine learning engine comprising a classifier configured to classify the text file for the sensitive content (e.g., multiclass classification for each item of sensitive content). In some embodiments, the electronic file may be preprocessed such that a plurality of input files are generated and inputted into a plurality of machine learning engines made up of several machine learning models, where each input file may have a specific format to facilitate prediction by certain machine learning models. Classifications provided by the machine learning engines may be combined to generate a report that indicates which items of sensitive content are contained in the electronic file.

For example, in some embodiments, a first machine learning engine may be configured to receive input files having a format corresponding to a numeric category. A second machine learning engine may be configured to receive input files having a format corresponding to a textual category. Preprocessing the electronic file in some embodiments may result in a first input file having the format corresponding to the numeric category and a second input file having the format corresponding to the textual category. The first input file may be inputted to the first machine learning engine for classification for sensitive content in the numeric category and the second input file may be inputted to the second machine learning engine for classification for sensitive content in the textual category. In some embodiments, the classification outputs from the first and second machine learning engines may be combined to generate a report that indicates items of the sensitive content that are contained in the electronic file.

Further details and additional embodiments are described below in reference to the accompanying figures.

Figure 1:
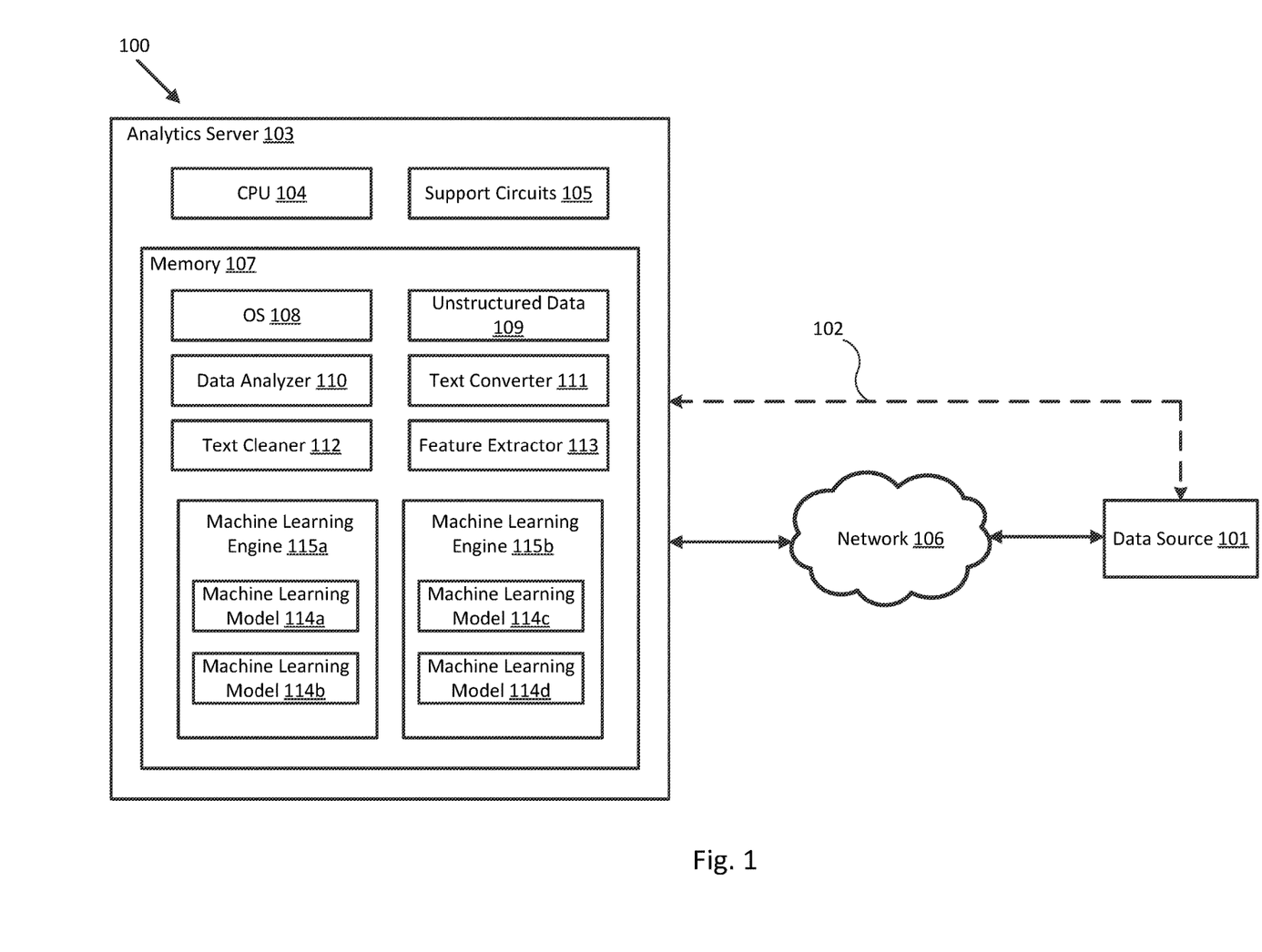
FIG. 1 illustrates a block diagram of a networked system suitable for implementing one or more embodiments of the present disclosure.

Referring now to FIG. 1, a block diagram of a system 100 configured to identify sensitive content from electronic files in accordance with one or more embodiments of the present disclosure is illustrated. The system 100 may include a data source 101 and an analytics server 103, which may be coupled via a network 106. In some embodiments, the data source 101 may be communicably coupled to the analytics server 103 directly via a connection link 102.

The data source 101 may provide data (e.g., unstructured data 109) to the analytics server 103 for the analytics server 103 to analyze and identify sensitive content in the data. In some embodiments, the data source 101 may provide data from multiple channels such as email, chat, chatbot, log, application forms, mobile application messages, contact center, social media, and so forth. The network 106 may be a communication network, such as a packet data switching network (e.g., the Internet, a proprietary network, a wireless GMS network, etc.). The network 106 can communicate data between the data source 101 and the analytics server 103.

The analytics server 103 may include a central processing unit (CPU) 104, support circuits 105, and a memory 107. The CPU 104 may be a hardware processor, microprocessor, microcontroller, etc. The support circuits 105 may provide functionality to the CPU 104, such as a user interface, clock circuits, network communications, cache, power supplies, input/output circuits, and so forth. The memory 107 may be a form of digital storage used for storing data and executable software for the analytics server 103. The memory 107 may include random access memory, read-only memory, disk storage, optical storage, etc.

The memory 107 may further include computer-readable instructions corresponding to an operation system (OS) 108, an unstructured data 109, a data analyzer 110, a text converter 111, a text cleaner 112, a feature extractor 113, machine learning models 114a-114d, and machine learning engines 115a-115b. According to various embodiments, the data analyzer 110 may categorize the unstructured data 109, which may belong to an electronic file, based on a file type of the electronic file. For example, if the received unstructured data 109 is PDF data, the PDF data is categorized under the PDF file type. The data analyzer 110 may provide the data and/or the data categorization to the text converter 111.

In some embodiments, the text converter 111 may convert the unstructured data 109 into a text format based on the data category provided by the data analyzer 110. For example, if the data category is audio, the text converter 111 may convert the audio file into text by sending the audio file to an automatic speech recognition (ASR) engine, which returns transcribed text (e.g., plain text file, text file) of the audio file. As another example, if the unstructured data 109 has a data category of imagery, the text converter 111 may convert the image file into text by sending the image file to an optical character recognition (OCR) engine, which returns a text file of the words in the image file. In yet another example, if the unstructured data 109 has a data category of PDF, the text converter 111 may convert the PDF file into text by sending the PDF file to a PDF-to-text conversion engine, which returns a text file of the words in the PDF file. Various other categories of data may be converted to text files by the text converter 111, such as XML files, JSON files, CSV files, etc. Converting such data categories to text files may be performed using one or more text conversion algorithms as would be understood by one of skill in the art.

In various embodiments, the text cleaner 112 may process the text file from the text converter 111 (e.g., the text extracted from the unstructured data 109) to remove noise. The noise may be removed from the text file to increase sensitive content prediction accuracy of the machine learning engines 115a-115b. In some cases, noise may include unwanted information present in the extracted text, such as punctuation marks, stop words, white spaces, contractions, special characters, accented words, and other non-substantive data.

According to some embodiments, the feature extractor 113 may extract features from the text to provide machine-readable vectors and/or a numerical digital representation suitable for processing by machine learning engines 115a and/or 115b. For example, vectorization of the text may be performed by using sentence/word embedding algorithms such as binary term frequency, bag of words, term frequency-inverse document frequency (TF-IDF), continuous bag of words (CBOW), skip-gram (SG), one-hot encoding or count vectorization, word2vec, glove, fastText, embedding from language models (ELMo), transformers, etc. Converting such text to vectors may be performed using one or more text embedding algorithms as would be understood by one of skill in the art.

As an illustration, the feature extractor 113 may utilize a transformers-based word embedding algorithm to convert the preprocessed text, from the text cleaner 112, into a vector(s) representing input features. The transformers-based word embedding algorithm may be context sensitive and use an attention mechanism to describe the connections and dependencies of each word in relation to other words in a sentence. In other embodiments, the feature extractor 113 may convert the preprocessed text into the vector(s) by using Bidirectional Encoder Representations from Transformers (BERT) word embedding techniques as would be understood by one of skill in the art.

In further embodiments, the feature extractor 113 may extract patterns and keywords of sensitive content from the preprocessed text, from the text cleaner 112, to assist machine learning models in detecting numerical items of sensitive content, such as social security numbers, phone numbers, account numbers, bank card numbers, etc. For example, the feature extractor 113 may extract a pattern corresponding to a nine-digit number having a numeric digit pattern of three-two-four for a social security number. In some cases, the feature extractor 113 may combine context features and patterns to yield combined features, which may be inputted to the machine learning engines 115a and/or 115b.

The machine learning engines 115a-115b may operate machine learning models 114a-114c to analyze the combined input features and generate an output indicating whether the electronic file contains sensitive content. In some embodiments, the output from the machine learning engines 115a-115b may directly indicate whether the processed file contains sensitive content, while in other embodiments, the output from the machine learning engines 115a-115b may be interpreted, for example, by a user or a software module, to determine whether the processed file contains sensitive content.

According to some embodiments, one or more of the machine learning models 114a-114c may be trained using combined features of preprocessed text for which sensitive content labels are known. One or more of the machine learning models 114a-114b of the machine learning engines 115a-115b may be implemented using machine learning classifiers, such as Random Forest (RF), Neural Network (NN), Convolutional Neural Network (CNN), Support Vector Machine (SVM), Recurrent Neural Network (RNN), Transformer, etc. Converting such labeled data to trained models may be performed using one or more machine learning algorithms as would be understood by one of skill in the art.

Figure 2A:
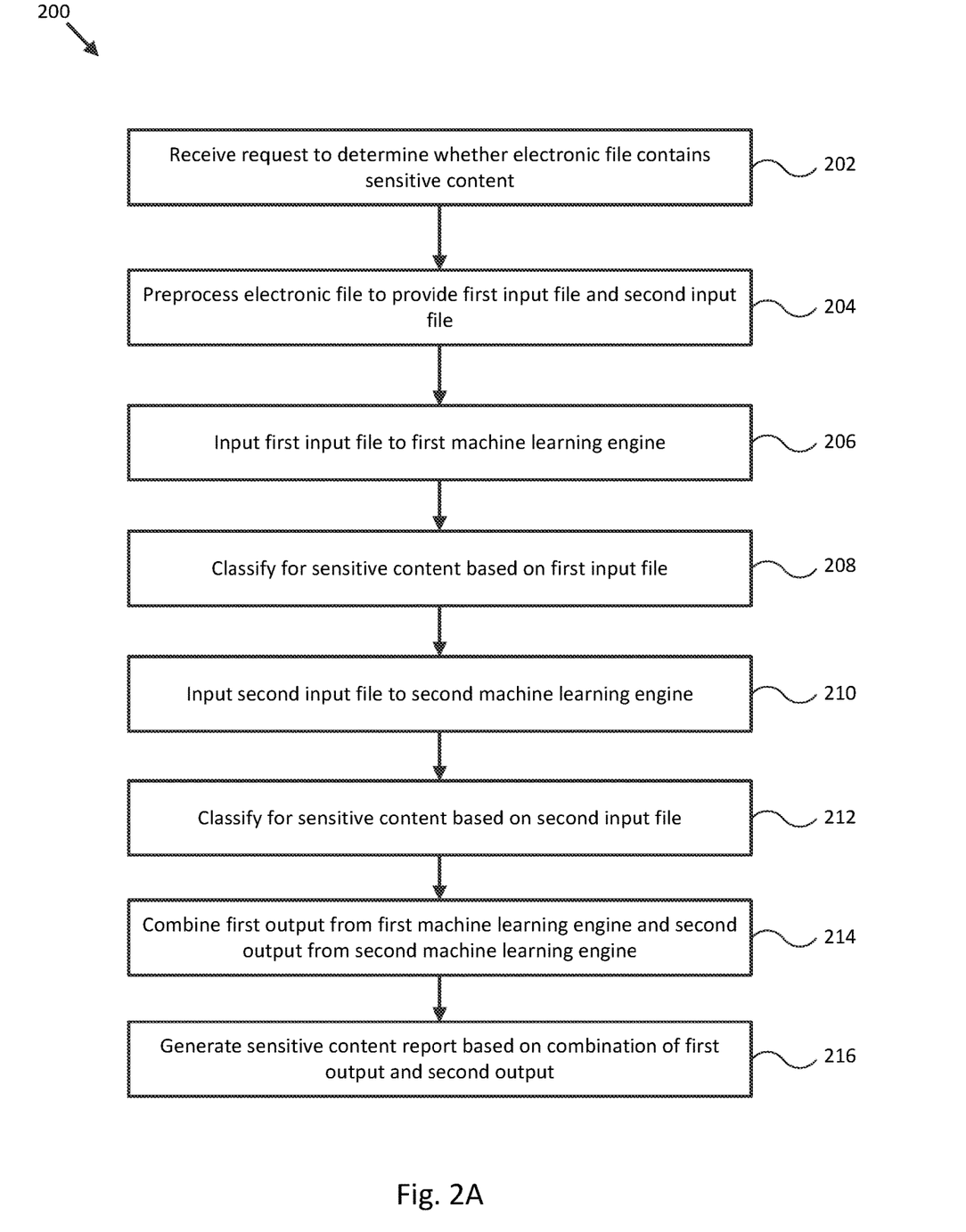
FIGS. 2A and 2B illustrate flow diagrams for a process for identifying sensitive content in electronic files in accordance with one or more embodiments of the present disclosure.

Referring now to FIG. 2A, illustrated is a flow diagram of a process 200 for identifying sensitive content in electronic files in accordance with one or more embodiments of the present disclosure. The blocks of process 200 are described herein as occurring in serial, or linearly (e.g., one after another). However, multiple blocks of process 200 may occur in parallel. In addition, the blocks of process 200 need not be performed in the order shown and/or one or more of the blocks of process 200 need not be performed. For explanatory purposes, process 200 is primarily described herein with reference to FIGS. 1 and 2B.

It will be appreciated that first, second, third, etc. are generally used as identifiers herein for explanatory purposes and are not necessarily intended to imply an ordering, sequence, or temporal aspect as can generally be appreciated from the context within which first, second, third, etc. are used.

At block 202, the system 100 receives a request (e.g., via the network 106) to determine whether an electronic file and/or any database directories (e.g., an electronic folder which contains multiple electronic files) contains sensitive content. For example, the request may be received from a tier associated with data privacy and/or computer security for an organization in a multitier architecture for the organization. The organization may want to know whether the electronic file contains sensitive content so that it may perform actions to comply with data privacy and computer security policies (e.g., deletion, notifying users, redaction, masking, etc.). In some cases, the electronic file may have unstructured data 109 that is not immediately recognizable as containing sensitive content, thus the organization may submit the request to the system 100, so that the system 100 may determine whether the electronic file contains sensitive content and identify such content.

Figure 2B:
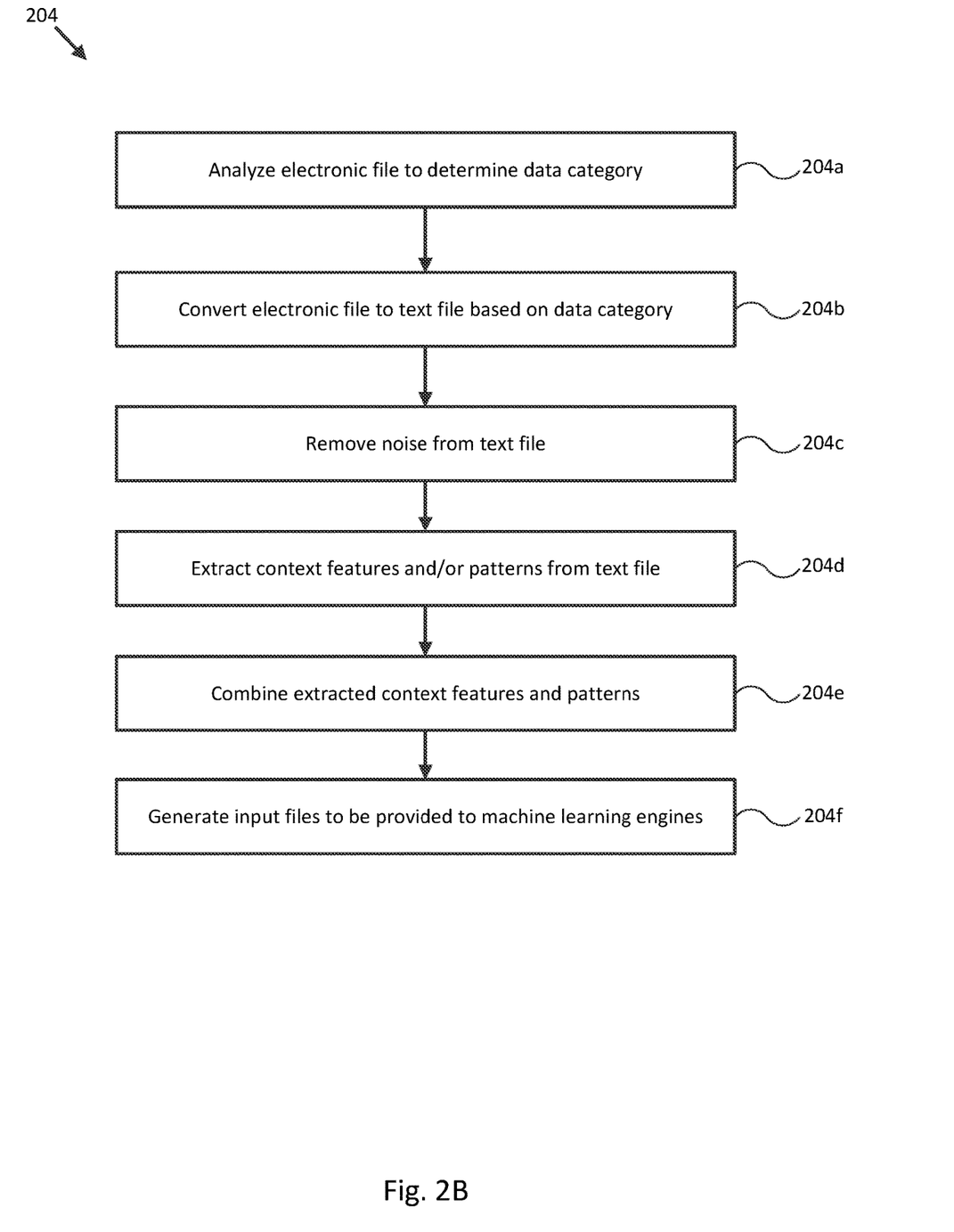

At block 204, the system 100 may preprocess the electronic file for input to the machine learning engines 115a and/or 115b. In an embodiment, processing the electronic file may include several operations, as shown in FIG. 2B. In some embodiments, the electronic file may be categorized into one of various types of files at block 204a. In an embodiment, the data analyzer 110 may categorize the electronic file based on its file format. For example, if the electronic file is a PDF, the data may be categorized under the PDF file type and the file's data and categorization may be shared to the text converter 111. Further example file types for the electronic file include an image file, an audio file, a PDF file, an XML file, a JSON file, an Excel file, a CSV file, a Doc file, text file, etc. The system 100 may source (e.g., retrieve, obtain) the electronic file from the data source 101, which may be a database storing records of emails, online chats (e.g., chats between a customer/client and an agent of the organization or chatbot), a log, an application form (e.g., a mobile application interface input), a contact center communication (e.g., voice messages, phone calls, chats, emails, scanned copies of correspondence, etc.), and/or social media (e.g., text or image posts, captions, comments, messages, etc.).

At block 204b, preprocessing the electronic file may include converting the electronic file to a text file if the electronic file is not already in a text file format. In an embodiment, the text converter 111 may convert the unstructured data 109 of the electronic file into a text format based on the data category provided by the data analyzer 110 at block 204a. For example, if the data category is audio, the text converter 111 may convert the audio file into text by sending the audio file to an automatic speech recognition (ASR) engine, which returns transcribed text for the audio file. As another example, if the unstructured data 109 has a data category of imagery, the text converter 111 may convert the image file into text by sending the image file to an optical character recognition (OCR) engine which returns a text file of the words in the image file. In yet another example, if the unstructured data 109 has a data category of PDF, the text converter 111 may convert the PDF file into text by sending the PDF file to a PDF to text converter engine which returns a text file of the words in the PDF file. Various categories of data may be converted to text files by the text converter 111, such as image files, audio files, a PDF file, an XML file, a JSON file, an Excel file, a CSV file, a Doc file, text file, etc. Converting such data categories to text may be performed using one or more text conversion algorithms implemented in a conversion engine as would be understood by one of skill in the art.

At block 204c, preprocessing the electronic file may further include the system 100 removing noise from the electronic file or the converted text file received from the text converter 111. For example, if conversion was performed on the electronic file, the text cleaner 112 may retrieve the converted text file from the text converter 111, to further preprocess the converted text file by removing noise from the converted text file. The noise may be removed to place the text file in a predictable and analyzable form to increase prediction accuracy of the machine learning engines 115a and/or 115b. In some cases, noise may include unwanted information present in the text, such as punctuation marks, stop words (e.g., "a", "the", "is", "are", etc.), white spaces, contractions, special characters, accented words, and so forth.

In some cases, removing noise may include lowercasing (e.g., lowercasing the text of the text file), stemming (e.g., reducing inflection in words to their root form (e.g., "troubled" and "troubles" to "trouble")), lemmatization (e.g., transforming words to their root word (e.g., "trouble", "troubling", "troubled", and "troubles" would be mapped to "trouble")), and normalization (e.g., transforming text into a standard form (e.g., "2moro" to "tomorrow")).

In various embodiments, at block 204d, preprocessing the electronic file at may further include the system 100 extracting context features and patterns from the text file. For example, the feature extractor 113 may convert preprocessed text of the electronic file into machine-readable vectors or a numerical digital representation suitable for processing as input features by machine learning models. For example, vectorization of the text may be performed by sentence/word embedding algorithms such as binary term frequency, bag of words, term frequency-inverse document frequency (TF-IDF), continuous bag of words (CBOW), skip-gram (SG), one-hot encoding or count vectorization, word2vec, glove, fastText, embedding from language models (ELMo), transformers, etc.

As an illustration, the feature extractor 113 may use a transformers-based word embeddings algorithm to convert the preprocessed text into vectors representing input features. The transformers-based word embeddings are context sensitive and use the attention mechanism to describe to connections and dependencies of each specific word with other words in a sentence. In some embodiments, the feature extractor 113 may convert the preprocessed text into the vectors by using the Bidirectional Encoder Representations from Transformers (BERT) word embedding techniques as would be understood by one of skill in the art.

In various embodiments, the feature extractor 113 may extract patterns and keywords of sensitive content from the preprocessed text for additional input features. For example, the feature extractor 113 may extract a pattern corresponding to a social security number (e.g., a nine-digit number having a numeric digit pattern of three-two-four). The feature extractor 113 may combine extracted context features and patterns to yield combined input features, which may be used as inputs to the machine learning engines 115a and/or 115b.

In various embodiments, preprocessing the electronic file may further include combining the extracted context features and patterns at block 204e to generate a first input file having a first format (e.g., combination of patterns and/or context features) corresponding to a numeric category and a second input file having a second format (e.g., context features) corresponding to a textual category as shown at block 204f.

The first format corresponding to a numerical category may allow the first input file to be more analyzable by the machine learning engine 115a to identify sensitive content that is numerical, such as a social security number, credit card number, International Bank Account Number (IBAN), bank card security code (e.g., CVV), Personal Identification Number (PIN), bank account number, device identifier, IP address, MAC address, account identifier, phone number, and so forth. In some cases, the patterns extracted from the preprocessed text file may be used in the first input file in combination with context features to facilitate classifying for the numerical items.

The second format corresponding to a textual category may allow the second input file to be more analyzable by the machine learning engine 115b to identify sensitive content that is textual and/or generally has context, such as an address (e.g., city, country, postal code, street number, state, zip code), biometric data, health data, citizenship, criminal records, date of birth, education, email address, gender identity, geolocation, income, ISP provider, marital status, veteran status, employer, family name, full name, given name, national origin, political affiliation, race, ethnicity, religion, social media handles, and so forth. For example, the context features extracted from the preprocessed text file may be used in the second input file to facilitate classifying for the textual items.

Referring back to FIG. 2A, at block 206, the system 100 may input the first input file to the machine learning engine 115a. The machine learning engine 115a may include machine learning models 114a-114b trained to classify for numerical items of sensitive content. For example, the machine learning model 114a and the machine learning model 114b may separately multi-label classify the first input file for numerical items of the sensitive content. As an illustration, a first classification may be provided by the machine learning model 114a in which the machine learning model 114a parses the first input file for a pattern corresponding to the numerical items. A second classification may be provided by the second machine learning model in which the second machine learning model uses a named-entity recognition (NER) and/or N-Gram approach to determine whether the numerical item is present based on the first input file.

The machine learning engine 115a may compare a confidence score of a classification of the first input file for the numerical items outputted by the machine learning model 114a to a confidence score of a classification of the first input file for the numerical items outputted by the machine learning model 114b. The machine learning engine 115a may determine a presence of the numerical items in the first input file based on the classification having a greater confidence score between the respective classifications outputted by the machine learning models 114a-114b for each numerical item. Thus, at block 208, the machine learning engine 115a may output a resulting classification for the first input file for each of the numerical items of sensitive content determined to be contained in the first input file.

At block 210, the system 100 may input the second input file to the machine learning engine 115b. The machine learning engine 115b may include machine learning models 114c-114d trained to identify textual items of sensitive content. The machine learning model 114c may have priority over the machine learning model 114d in some embodiments. Thus, the machine learning model 114c may attempt to classify the second input file for the textual items based on an available context for each of the textual items. If the machine learning model 114c does not have sufficient available context (e.g., not enough words/sentences to provide context) or returns a confidence score for a classification below a threshold level, the other machine learning model 114d may attempt to classify the second input file for that textual item, such as by using a keyword match (e.g., token-based) algorithm that does not rely on context to the same degree, if at all. For example, in one case, classifying the second input file may include using a complete contextual model and a token-based machine learning model for models 114c and 114d, where a classification by the complete contextual model has priority over a classification by the token-based machine learning model.

Thus, at block 212, if the machine learning model 114c provides a positive classification for a textual item, the machine learning engine 115b may output the positive classification for the textual item. If the machine learning model 114c does not provide a positive classification for a textual item, such as when it does not have sufficient context or makes a below-threshold positive classification, but the machine learning model 114*d* provides a positive classification for the textual item, then the machine learning engine 115*b* may output the positive classification for the textual item. If neither machine learning models 114*c* or 114*d* provides a positive classification for the textual item for the second input file, the machine learning engine 115*b* may output a negative classification for the textual item (e.g., the textual item of sensitive content is not predicted based on the second input file).

At block 214, the system 100 may combine the classification output from the machine learning engine 115*a* and the classification output from the machine learning engine 115*b*. Thus, with the combination of the classification based on the first input file by the machine learning engine 115*a* and the classification based on the second input file by the machine learning engine 115*b*, the electronic file will have been classified for numerical items and textual items of sensitive content.

It will be appreciated that the first input file and second input file may generally be provided in any form of input file containing extracted features and/or patterns that the machine learning engines 115*a* and 115*b* may take as input to output a multi-label classification for the numerical items and textual items of sensitive content. For example, the input files may be text files formatted such that features and/or patterns can be distinguished by the machine learning engines 115*a* and 115*b*.

At block 216, the system 100 may generate a report based on the combination of the classification output from the machine learning engine 115*a* and the classification output form the machine learning engine 115*b*. For example, the report may indicate which items of sensitive content are contained in the electronic file. As an illustration, the report may include a list such as "social security number, political affiliation, gender" if such items were found to be contained in the electronic file by the system 100.

The report may be provided to the organization that made the request to determine whether the electronic file contains sensitive content. In some cases, actions may be taken to comply with data privacy and computer security policies for the organization. For example, the electronic file may be deleted, redacted, locked, encrypted, etc. and/or customers/clients may be given notice and an opportunity to take actions related to the electronic file.

Figure 3:
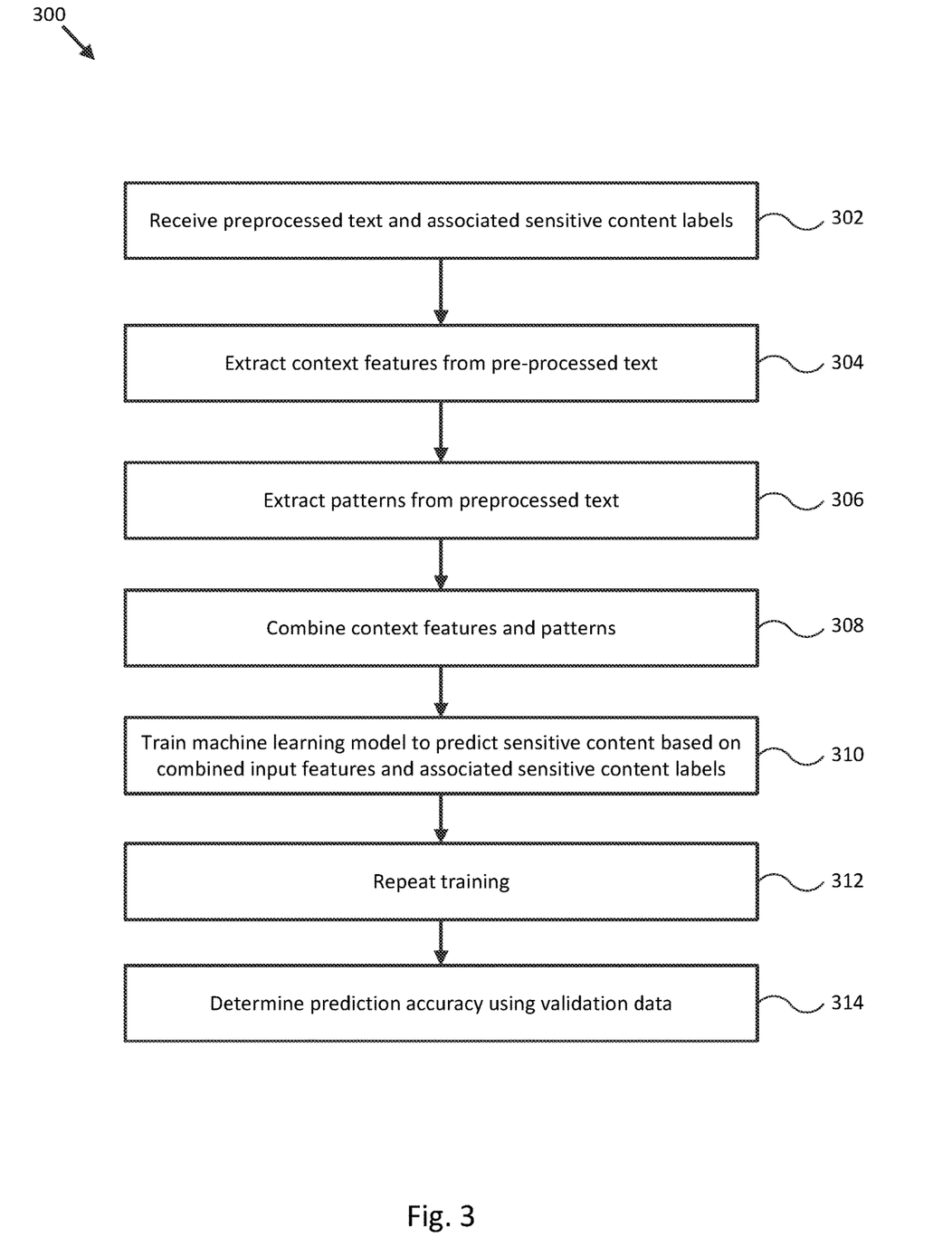
FIG. 3 illustrates a flow diagram of a process for training a machine learning model for identifying sensitive content in electronic files in accordance with one or more embodiments of the present disclosure.

Referring now to FIG. 3, illustrated is a flow diagram of a process 300 for training machine learning models, such as one or more of the machine learning models 114*a*-114*d* implemented in the system 100, for identifying sensitive content from unstructured data in accordance with one or more embodiments of the present disclosure. The blocks of process 300 are described herein as occurring in serial, or linearly (e.g., one after another). However, multiple blocks of process 300 may occur in parallel. In addition, the blocks of process 300 need not be performed in the order shown and/or one or more of the blocks of process 300 need not be performed.

At block 302, preprocessed text and associated sensitive content labels are received. In some embodiments, preprocessing of text may be performed by the text cleaner 112 of the system 100. In one case, an organization may provide the preprocessed text and associated labeled sensitive content from historic data collected by an organization or data created by the organization for machine training purposes. At block 304, context features may be extracted from the preprocessed text to be fed to a machine learning algorithm for training. In some embodiments, the context feature extraction may be performed by the feature extractor 113 of the system 100, for example, by vectorizing the preprocessed text using the BERT word embeddings algorithm or other word embedding algorithms discussed herein.

At block 306, patterns may be extracted from the preprocessed text. In some embodiments, the pattern extraction may also be performed by the feature extractor 113 of the system 100. As an example, a pattern for a social security number may be a nine-digit number that has a three-two-four pattern. As another example, a pattern for a telephone number may be an eleven-digit number that has a one-three-three-four pattern.

At block 308, the context features and patterns may be combined to yield combined features that may be paired with the sensitive content labels to create training data. At block 310, the training data, including the combined features and labels, may be inputted to a machine learning algorithm to create a trained machine learning model. Various machine learning algorithms may be implemented, including Random Forest, Neural Network, Convolutional Neural Network, Support Vector Machine, Recurrent Neural Network (RNN), Transformer, and so forth. At block 312, the previous steps of the process 300 may be repeated to train the machine learning model using additional training data.

At block 314, the machine learning model predication accuracy may be determined using a validation dataset. For example, input features from the validation dataset may be inputted to the trained machine learning model, and an output by the machine learning model may be compared against the known outcome for the inputted features to determine the accuracy of the machine learning model. In some embodiments, the machine learning model may be further trained or retrained using different or more training datasets to yield a desired accuracy. In some implementations, different machine learning algorithms may be implemented, parameters and weights may be tuned, and features may be added or removed in training datasets until a sufficient prediction accuracy is achieved.

Figure 4:
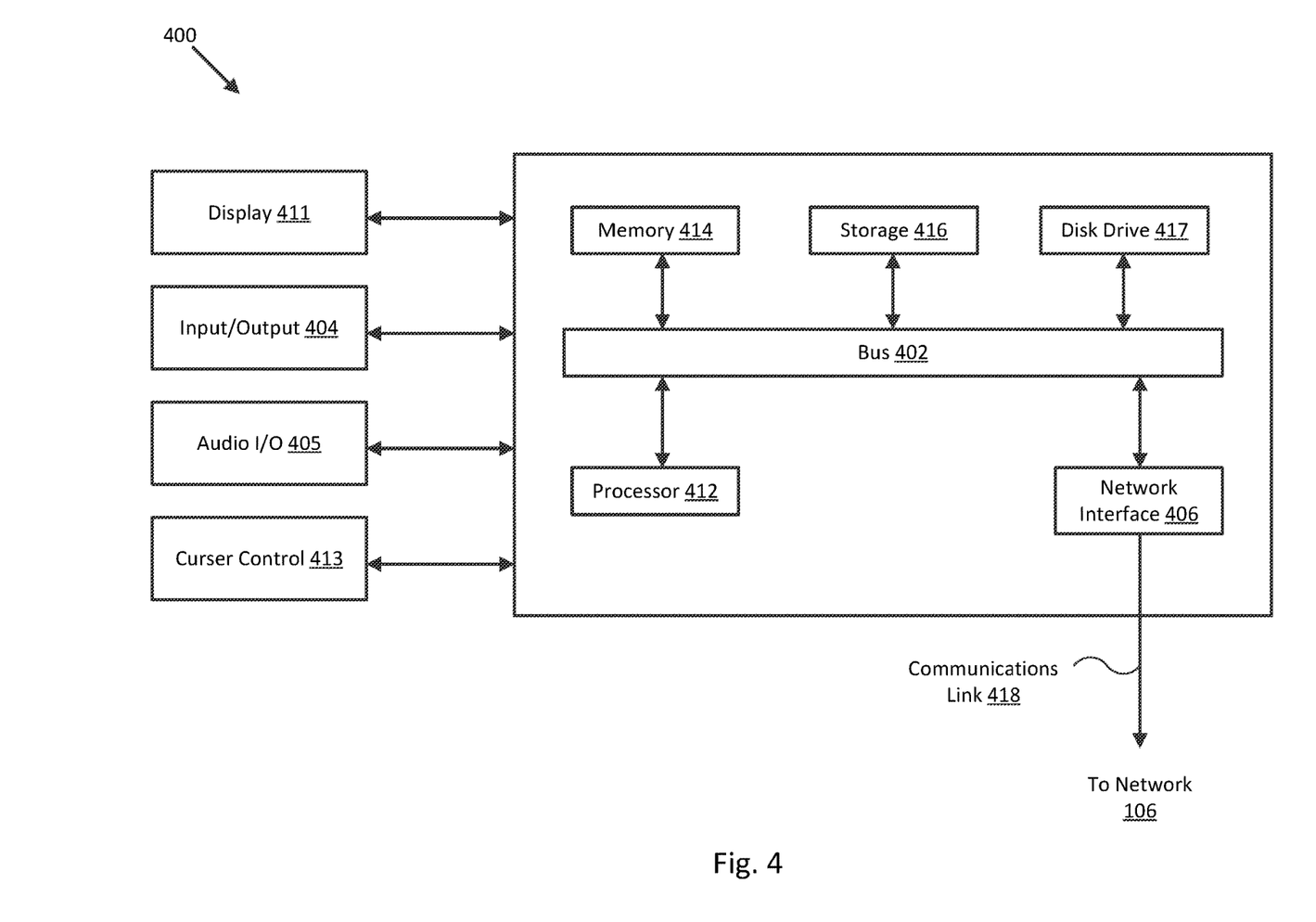
FIG. 4 illustrates a block diagram of a computer system in accordance with one or more embodiments of the present disclosure.

FIG. 4 illustrates a block diagram of a computer system 400 suitable for implementing one or more embodiments of the present disclosure. It should be appreciated that each of the devices utilized by users, entities, and service providers discussed herein (e.g., system 100) may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). I/O component 404 may further include NFC communication capabilities. An optional audio I/O component 405 may also be included to allow a user to use voice for inputting information by converting audio signals. Audio I/O component 405 may allow the user to hear audio. A transceiver or network interface 406 transmits and receives signals between computer system 400 and other devices, such as another user device, an entity server, and/or a provider server via network 106. In one embodiment, the transmission is wireless, although other transmission mediums and methods may also be suitable. Processor 412, which may be one or more hardware processors, can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer-readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A computer system comprising:
a non-transitory memory storing instructions; and
one or more hardware processors configured to read the instructions and cause the computer system to perform operations comprising:
receiving a request to determine whether an electronic file contains sensitive content;
preprocessing the electronic file based on a type of the electronic file, wherein the preprocessing results in a first input file having a first format corresponding to a numeric category and a second input file having a second format corresponding to a textual category;
inputting the first input file to a first machine learning engine configured to receive input files having the first format;
classifying, based on an output of the first machine learning engine from the inputting the first input file, the first input file for the sensitive content;
inputting the second input file to a second machine learning engine configured to receive input files having the second format;
classifying, based on an output of the second machine learning engine from the inputting the second input file, the second input file for the sensitive content; and
generating a report based on a combination of a first output from the first machine learning engine and a second output from the second machine learning engine, wherein the report indicates items of the sensitive content that are contained in the electronic file.

2. The computer system of claim 1, wherein the first machine learning engine comprises two machine learning models that separately classify the first input file for numerical items of the sensitive content.

3. The computer system of claim 2, wherein the operations further comprise:
for each of the numerical items:
comparing a confidence score of a classification of the first input file for the numerical item outputted by a first machine learning model to a confidence score of a classification of the first input file for the numerical item outputted by a second machine learning model, wherein the two machine learning models comprise the first machine learning model and the second machine learning model; and
determining a presence of the numerical item in the first input file based on the classification having a greater confidence score between the respective classifications outputted by the first machine learning model and the second machine learning model for the numerical item.

4. The computer system of claim 1, wherein the second machine learning engine comprises two machine learning models that separately classify the second input file for textual items of the sensitive content.

5. The computer system of claim 4, wherein the operations further comprise:
   classifying, by a first machine learning model, the second input file for the textual items based on an available context for each of the textual items, wherein one of the two machine learning models comprises the first machine learning model.

6. The computer system of claim 5, wherein the operations further comprise:
   for each textual item that does not have the available context, classifying, by a second machine learning model, the second input file for the textual item using a keyword match algorithm, wherein the two machine learning models further comprises the second machine learning model.

7. The computer system of claim 1, wherein the preprocessing the electronic file to provide the first input file comprises:
   categorizing the electronic file based on a file type of the electronic file;
   converting the electronic file from a non-text file to a text file based on the file type.

8. The computer system of claim 7, wherein the preprocessing the electric file to provide the first input file further comprises:
   removing noise from the first input file to place the first input file in the first format.

9. The computer system of claim 1, wherein the preprocessing comprises:
   vectorizing the first input file and the second input file using a word embedding algorithm; and
   extracting at least one pattern in the first input file,
   wherein the vectors and at least one pattern corresponding to the first input file and the vectors corresponding to the second input file are provided as input features to the respective machine learning engines.

10. A method comprising:
    receiving a request to determine whether an electronic file contains sensitive content;
    preprocessing the electronic file to provide a first input file having a first format corresponding to a numeric category and a second input file having a second format corresponding to a textual category;
    classifying the first input file for the sensitive content by inputting the first input file to a first machine learning engine trained to receive input files having the first format and output classifications for numerical items of the sensitive content;
    classifying the second input file for the sensitive content by inputting the second input file to a second machine learning engine trained to receive input files having the second format and output classifications for textual items of the sensitive content; and
    combining the output from the first machine learning engine and the output from the second machine learning engine into a report that indicates one or more items, of the numerical items and textual items of the sensitive content, that is contained in the electronic file.

11. The method of claim 10, further comprising removing one or more of punctuation marks, stop words, contractions, special characters, or accented words from the first input file and the second input file.

12. The method of claim 10, wherein classes of the numerical items comprise a credit card number, a debit card number, and a social security number.

13. The method of claim 10, wherein the preprocessing the electronic file comprises converting the electronic file from an image file, an audio file, a PDF file, an xml file, a json file, or a CSV file to a text file.

14. The method of claim 10, wherein the electronic file is sourced from one of an email, an online chat, a chatbot, a log, a mobile application, a contact center record, or social media.

15. The method of claim 10, wherein the first machine learning engine comprises two machine learning models, and wherein the classifications outputted by the first machine learning engine comprise a comparison of a first classification by a first machine learning model of the first machine learning engine to a second classification by a second machine learning model of the first machine learning engine for each of the numerical items.

16. The method of claim 15, wherein the first classification by the first machine learning model comprises parsing the first input file for a pattern corresponding to the numerical items, and
   wherein the second classification by the second machine learning model comprises using a named-entity recognition or n-gram algorithm to determine whether the numerical item is in the first input file.

17. The method of claim 10, further comprising vectorizing the preprocessed electronic file to provide first features of the first input file and second features of the second input file, wherein the first machine learning engine classifies the first input file based on the first features, and wherein the second machine learning engine classifies the second input file based on the second features.

18. The method of claim 10, wherein the classifying the second input file comprises using a token-based machine learning model and a complete contextual model of the second machine learning engine, wherein a classification by the complete contextual model has priority over a classification by the token-based machine learning model.

19. A non-transitory machine-readable medium having instructions stored thereon, wherein the instructions are executable to cause a machine of a system to perform operations comprising:
   receiving a request to determine whether an electronic file contains sensitive content;
   categorizing the electronic file based on a file type of the electronic file;
   converting the electronic file into a text file based on a category of the electronic file;
   extracting features and/or patterns from the text file to provide a first input file having a first format corresponding to a numeric category and a second input file having a second format corresponding to a textual category;
   inputting the first input file to a first machine learning engine trained to receive input files having the first format and output classifications for numerical items of the sensitive content;
   classifying, based on an output of the first machine learning engine from the inputting the first input file, the first input file for the sensitive content;
   inputting the second input file to a second machine learning engine trained to receive input files having the second format and output classifications for textual items of the sensitive content;
   classifying, based on an output of the second machine learning engine from the inputting the second input file, the second input file for the sensitive content; and
   combining the output from the first machine learning engine and the output from the second machine learning engine into a report that indicates one or more items, of the numerical items and textual items of the sensitive content, that is contained in the electronic file.

20. The non-transitory machine-readable medium of claim 19, wherein the first machine learning engine comprises two machine learning models that separately classify the first input file for a presence of the numerical items, and wherein the second machine learning engine comprises another two machine learning models that separately classify the second input file for a presence of the textual items.

\* \* \* \* \*